Dec. 8, 1942. R. L. HAYNES 2,304,355
MOTOR DRIVE SYSTEM
Filed Jan. 2, 1940 3 Sheets-Sheet 1

Inventor
Robert L. Haynes
By
Attorney

Dec. 8, 1942.     R. L. HAYNES     2,304,355
MOTOR DRIVE SYSTEM
Filed Jan. 2, 1940     3 Sheets-Sheet 2

FIG. 2.   SYNCHRONOUS MOTOR SYSTEM WITH INTERLOCK FROM START SEQUENCE OF SWITCHING

| MANUALLY OPERATED SWITCHES | | | | OPERATING CONDITION | APPROX. SPEED | AUTOMATICALLY OPERATED SWITCHES | | | |
|---|---|---|---|---|---|---|---|---|---|
| SWITCH "A" | | SWITCH "B" | | | | SWITCH "C" | | SWITCH "E" | |
| OPEN | CLOSED | OPEN | CLOSED | | | UP | DOWN | LEFT | RIGHT |
| X | | X | | POWER OFF | 0 | X | | X | |
| | X | X | | INTERLOCK | 0 | X | | X | |
| | X | | X | | 0 | | X | X | |
| | X | | X | ACCELERATE | 100 | | X | X | |
| | X | | X | | 500 | | X | | X |
| | X | | X | RUN | 1800 | | X | | X |
| | X | X | | | | | X | | X |
| | X | X | | DECELERATE | 500 | | X | X | |
| | X | X | | | 100 | | X | X | |
| | X | X | | INTERLOCK | 0 | UP AFTER MACHINE STOPS ROTATING | | X | |
| X | | X | | POWER OFF | 0 | | | X | |

Inventor
Robert L. Haynes
By [signature]
Attorney

Dec. 8, 1942.   R. L. HAYNES   2,304,355
MOTOR DRIVE SYSTEM
Filed Jan. 2, 1940   3 Sheets-Sheet 3
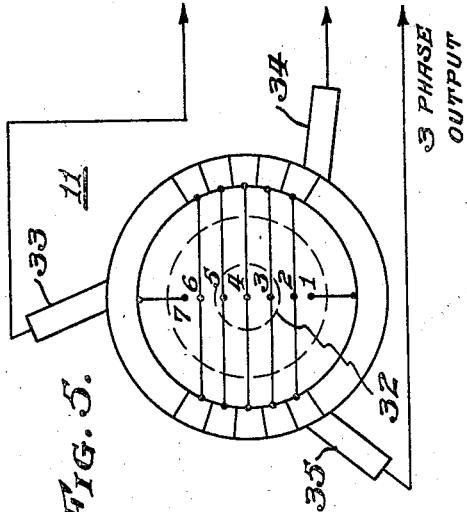
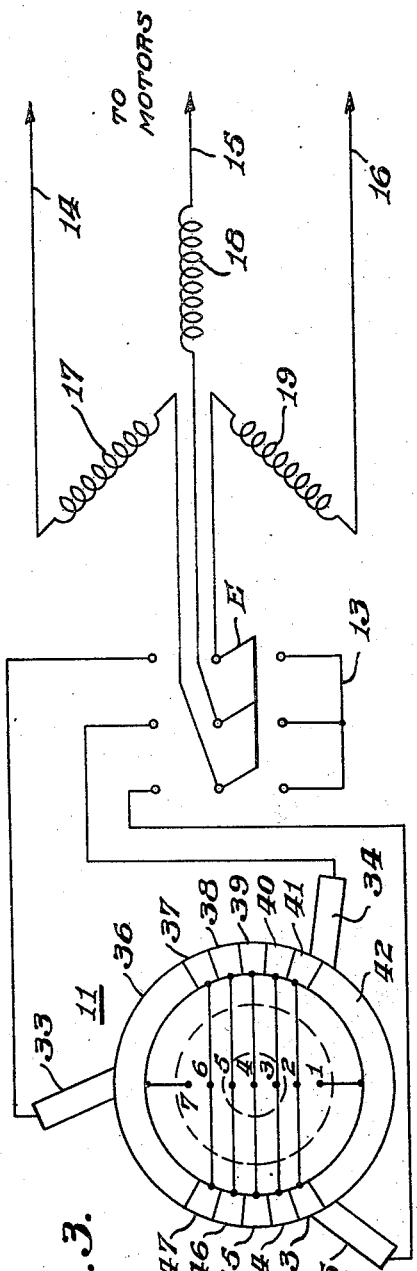
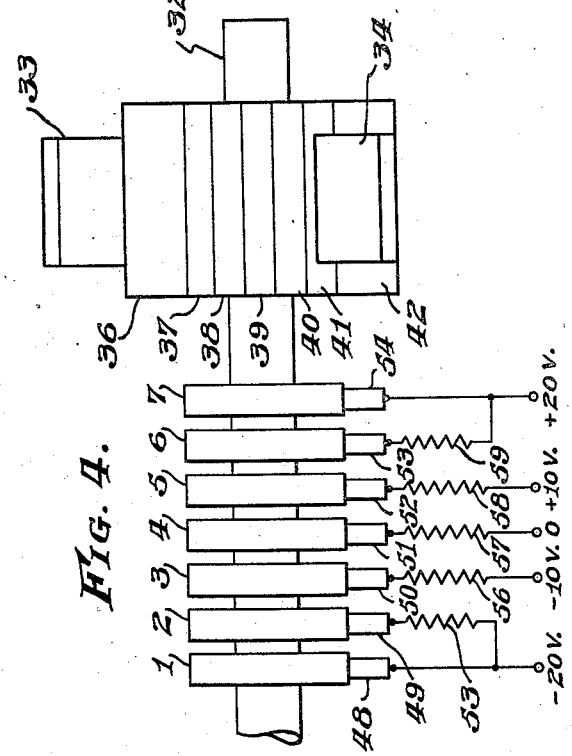
Inventor
Robert L. Haynes
By
Attorney

UNITED STATES PATENT OFFICE 2,304,355

MOTOR DRIVE SYSTEM

Robert L. Haynes, Haddon Heights, N. J., assignor to Radio Corporation of America, a corporation of Delaware Application January 2, 1940, Serial No. 312,062

6 Claims. (Cl. 172—293)

This invention relates to motor drive systems such as are useful in correlating the speeds of a plurality of separate motors under different conditions of operation, and has for its principal object the provision of an improved drive system and method of operation whereby variation in the relation between the speeds of such motors is obviated or minimized.

Where it is necessary to drive several mechanisms which cannot be mechanically interconnected but which must run in strict synchronism, it is in most applications satisfactory to operate the several mechanisms by means of synchronous motors all supplied from the same power system. In other applications, it is necessary that the synchronism be preserved throughout the operations of bringing the machines up to speed or stopping them. In other words, the several mechanisms are locked together as if mechanically interconnected, and this interconnection is not broken at any time. Where this is required, it is usual to employ Selsyn motors. These have been used for many years and their principle of operation is well known. Briefly stated, a Selsyn motor is essentially the same as a wound rotor induction motor. Both the rotor and stator windings are preferably polyphase, but one or the other may be single phase and the system will still work. If the rotors of the several machines are connected together but not connected to any external source of power, and the stators are all supplied with alternating current from a common source, the rotors will seek a position at which the secondary or rotor winding voltages are substantially balanced and little cross current flows. If one of the rotors is forcibly turned, all of the other rotors seek a new position of equilibrium, and this following of one by the others continues for all speeds up to synchronism, although the torque by which the several motors are held in step or synchronism becomes weak as the rotor speed approaches the synchronous speed of the stator field. The frequency of the cross currents which hold the machines together approaches zero as synchronous speed is approached and likewise the voltage which drives the currents through the windings approaches zero. Therefore, it is not practical to operate Selsyn motors close to synchronous speed. It is common to operate them at from one-half to two-thirds synchronous speed. It is equally possible to use the rotor windings as the primary to which the A.-C. voltage is applied and to interconnect the stators which then act as secondary.

An important example of the application of Selsyn motors is in rerecording sound for motion pictures. In this work, it is necessary to thread film records into a number of reproducing machines in such positions that the contribution of each original record to the final recording in which these various original records are combined will occur at exactly the right time. The only practical way to preserve this synchronism is to have the machines so arranged that they will all come up to speed together, run together and slow down together.

Although Selsyn motors have been fairly satisfactory for this purpose, they are not above reproach. In certain applications, of which recording sound is a striking example, a degree of speed constancy is required far in excess of that which is needed for most other purposes. Synchronous driving systems, whether employing ordinary synchronous motors or Selsyn motors, are subject to hunting, or an oscillatory action superimposed on their continuous rotation. This phenomenon has been recognized for years in synchronous motors and is well understood. The oscillations in many cases are not continuous and, after a disturbance, persist for only a few cycles, but they are started again by any little disturbance in power supply or load. The cure for hunting lies in endowing the motors with the property of damping out oscillations. Synchronous motors can be given very powerful damping properties by the use of pole face grids. The same expedient is not applicable to Selsyn motors and these are inherently more subject to oscillations and do not give as high an order of speed constancy as the synchronous motors. Builders of Selsyn motors have resorted to such expedients as coupling mechanical damping devices to the motors, which absorb energy from any oscillatory movement. This method is helpful but heavy and cumbersome and not as satisfactory as the damping which is obtained in synchronous motors.

In accordance with the present invention, synchronous motors are utilized for driving the various load devices and suitable means are provided for operating these motors in interlocked relation from standstill to normal operating speed. The illustrated example of such interlocking and accelerating means is a combination which includes (1) a direct current source provided with a plurality of terminals maintained at different voltages, (2) an alternating current generator driven by a direct current motor, and (3) an inverter or commutator device, connected between the direct current source and the neutral leads of the generator. During acceleration of the load motors they are interlocked with the generator through which they receive a current of a frequency which increases as the speed of the commutator and generator (both mounted on the same shaft) is increased. When normal operating speed is attained, the neutral leads of the generator are disconnected from the inverter or commutator device and short-circuited, and the load motors may thereafter derive their operating power from the generator or from any other suitable alternating current source.

While the direct current source and polyphase commutator combination is a satisfactory means of operating the load motors in interlocked relation at low speeds, it is not altogether adequate for high speed operation. Much more satisfactory for high speed operation is the ordinary polyphase alternator which is incapable of operation at speeds approaching zero. By combining the commutator and alternator in one unit, satisfactory operation over the entire speed range is realized. Thus the commutator and direct current source carry the entire load at low speeds, the load is gradually shifted to the alternator as the speed increases and, at the higher speeds, the alternator takes most of the load or may be made to take the entire load if the commutator is excluded from the circuit.

By suitably connecting the direct current terminals to the commutator bars, the delivered alternating current voltage may be made to have any desired wave shape. The frequency of this current is determined by the commutator speed and its voltage by that of the direct current source terminals. Resistors of suitable value are advantageously provided in the direct current leads of the commutator for preventing high short circuit currents.

The invention will be better understood from the following description considered in connection with the accompanying drawings, and its scope is indicated by the appended claims.

Referring to the drawings:

Figure 2 is a tabulation showing the switching sequence of the system of Fig. 1, and Figures 3, 4 and 5 illustrate various features of a commutator device which forms part of the direct current to alternating current converter.

Figure 1:
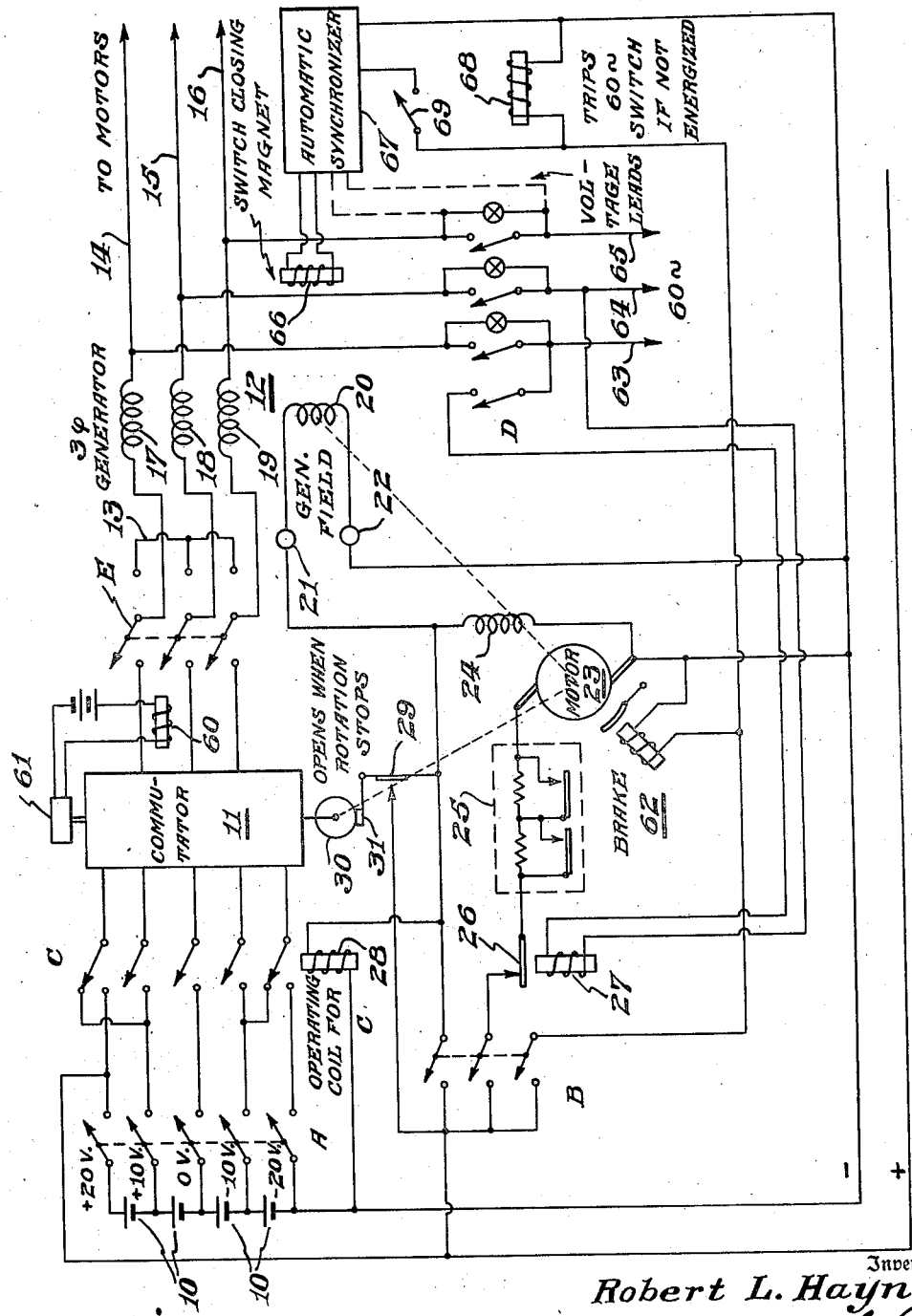
Figure 1 is a wiring diagram of the improved multi-load drive system.

The system of Fig. 1 includes a direct current source 10, provided with a plurality of terminals which are maintained at the different indicated voltages and are arranged to be connected to the slip rings of a commutator device 11. A switch E is provided for connecting the neutral leads of an alternator 12 either to the alternating current output terminal of the commutator device 11 or to a short-circuiting connection 13. The alternator 12 is provided with polyphase stator windings 17, 18 and 19 and with a field winding 20 adapted to be connected through slip rings 21—22 and the upper blade of a switch B to the direct current source 10.

The commutator or frequency changer device 11 and the alternator 12 are mounted on the same shaft or otherwise mechanically coupled together and are driven by a direct current motor 23 which includes (1) a field winding 24 adapted to be connected to the source 10 through the upper blade of the switch B and (2) an armature circuit adapted to be connected to the source 10 through any suitable type of automatically operated accelerating means 25, a switch 26 provided with an operating solenoid 27, and the middle blade of the switch B. The upper blade of the switch B also controls the supply of current to the operating solenoid 28 of the switch C and is itself shunted by a switch 29 which is maintained closed by a speed responsive device (shown as a friction disc 30 and brush 31) until rotation of the commutator device 11, the alternator 12 and the motor 23 stops.

The various details of the commutator device 11 are shown more clearly in Figs. 3, 4 and 5. It is mounted on a shaft 32 and includes alternating current output brushes 33, 34 and 35, and commutator bars 36 to 47 which cooperate with the brushes 33 to 35 and are interconnected as indicated by the leads 1 to 7, these leads being connected, respectively, to the correspondingly numbered slip rings mounted on the shaft 32. Cooperatively arranged with respect to the slip rings 1 to 7 are the brushes 48 to 54, resistors 55 to 59 being connected in the respective leads of the brushes 49 to 53 for maintaining a proper distribution of current between the bars during the commutating action. The slip rings 1 to 7 are, of course, connected through the switches A and C (Fig. 1) to the direct current source terminals as indicated at the lower part of Fig. 4.

For automatically operating the switch E to its right hand closed position when the speed of the device 11 exceeds a predetermined value, and to its left hand closed position when the speed of the device 11 decreases below this predetermined value, a solenoid 60 (Fig. 1) having its connections controlled by a centrifugal switch 61 or the like may be provided.

The method of controlling the operation of the system is apparent from the tabulation of Fig. 2.

Thus power is off the system when the switches A and B are open, the switch C is in its upper closed position and the switch E is closed to the left. For interlocking the load motors connected to the output leads 14, 15 and 16, the switch A is closed. Acceleration of the devices 11, 12 and 23 is initiated by closure of the switch B and operation of the switch C to lower closed position. During the acceleration period (controlled by the device 25) the frequency of the alternating current delivered at the brushes 33, 34 and 35 is gradually increased and the output load is gradually shifted from the source 10 to alternator 12. When a speed of the order of 500 R. P. M. has been attained, the switch E is automatically operated to its right hand closed position for excluding the commutator device 11 from the circuit and interconnecting the neutral leads of the polyphase winding 17—18—19. As indicated by the tabulation of Fig. 2, the process of deceleration is the reverse of that followed during the acceleration period.

The switch 29, of course, functions to prevent opening of the switch B and interruption of the field circuits of the alternator 11 and motor 23 until they have reached standstill. As indicated in Fig. 1, a brake 62 controlled through the lower blade of the switch B may be provided for decelerating the motor 23, the alternator 12 and the device 11.

After closure of the switch E to its right hand closed position, the load motors, which are of the synchronous type, are supplied with power from the alternator 12.

If desired, this load may be transferred to an alternating current supply line 63—64—65 through a switch D. To this end the switch D is provided with (1) a solenoid 66 which is connected across the switch D through an automatic synchronizer 67 and (2) a solenoid 69 which is connected to the source 10 through the lower blade of the switch B for opening the switch D when the selector switch 69 is open and power is supplied from the alternator 12. For deenergizing the motor 23 when the load motors are supplied from the polyphase circuit 63—64—65, one phase of this line is connected to the solenoid 27 through the left hand blade of the switch D, thus interrupting the armature circuit of the motor 23.

I claim as my invention:

1. In a drive system for the operation of a plurality of synchronous motors in synchronism from standstill to full speed, the combination of an alternator provided with neutral terminals and connections for the motors to be driven, direct current supply terminals each adapted to be maintained at a different voltage, an inverter connected between said neutral and said direct current terminals, impedance means interconnected with said direct current leads to produce a desired distribution of direct current to said inverter, and motors connected to the output of said alternator.

2. In a drive system for the operation of a plurality of synchronous motors in synchronism from standstill to full speed, the combination of an alternator provided with neutral terminals and connections for the motors to be driven, direct current supply terminals each adapted to be maintained at a different voltage, a commutator device provided with brushes connected to said neutral terminals and with slip rings connected to said direct current supply terminals, impedance means interconnected with said direct current supply terminals for producing a suitable distribution of current to said slip rings, and motors connected to the output of said alternator.

3. In a drive system for the operation of a plurality of synchronous motors in synchronism from standstill to full speed, the combination of an alternator provided with neutral terminals and connections for the motors to be driven, direct current supply terminals each adapted to be maintained at a different voltage, a commutator device provided with brushes connected to said neutral terminals and with slip rings connected to said direct current supply terminals, impedance means interconnected with said direct current supply terminals for producing a suitable distribution of current to said slip rings, means for short-circuiting said neutral terminals when said alternator has attained a predetermined sub-normal speed, and motors connected to the output of said alternator.

4. In a drive system for the operation of a plurality of synchronous motors in synchronism from standstill to full speed, the combination of an alternator provided with neutral terminals, means for applying to said neutral terminals an alternating voltage of a gradually variable frequency, means for interconnecting the neutral terminals for synchronous operation, motors for operation by said system, means for transmitting the output of said system to the motors to be driven, and means for transferring the motor circuits to a separate source of alternating current at synchronous speed.

5. In a drive system for the operation of a plurality of synchronous motors in synchronism from standstill to full speed, the combination of an alternator provided with neutral terminals, means for applying to said neutral terminals an alternating voltage of a gradually variable frequency, means for short-circuiting said neutral terminals when the speed of said alternator has attained a predetermined value, motors for operation by said system, means for transmitting the output of said system to the motors to be driven, and means for transferring the motor circuits to a separate source of alternating current at synchronous speed.

6. In a drive system for the operation of a plurality of synchronous motors in synchronism from standstill to full speed, the combination of an alternator provided with neutral terminals, direct current supply terminals each adapted to be maintained at a different voltage, an inverter connected between said neutral and said direct current terminals, means for interconnecting the neutral terminals for synchronous operation, motors for operation by said system, means for transmitting the output of said system to the motors to be driven, and means for transferring the motor circuits to a separate source of alternating current at synchronous speed.

ROBERT L. HAYNES.